Oct. 31, 1961

R. L. MIGHELL 3,006,422

AUTOMATIC MECHANISM FOR OPERATING
A WHEEL SUPPORTED MULCHER

Filed March 3, 1959

INVENTOR:
Russell L. Mighell
BY
Eberhard E. Wetty
Atty.

R. L. MIGHELL
AUTOMATIC MECHANISM FOR OPERATING
A WHEEL SUPPORTED MULCHER 3,006,422

Filed March 3, 1959

INVENTOR:
Russell L. Mighell
BY
Eberhard E. Wettey
Atty

Oct. 31, 1961

R. L. MIGHELL

3,006,422

AUTOMATIC MECHANISM FOR OPERATING
A WHEEL SUPPORTED MULCHER

Filed March 3, 1959

INVENTOR:
Russell L. Mighell
BY
Eberhard E. Whitley
Atty.

3,006,422
AUTOMATIC MECHANISM FOR OPERATING A WHEEL SUPPORTED MULCHER

Russell L. Mighell, Kewanee, Ill., assignor to Kewanee Machinery & Conveyor Company, Kewanee, Ill., a corporation of Illinois
Filed Mar. 3, 1959, Ser. No. 796,778
17 Claims. (Cl. 172—142)

This invention relates to a combination of power driven mechanisms that function to automatically control and operate the working tools of a wheel mounted agricultural implement.

More specifically, the invention is directed to a power mechanism employed in combination with interconnected linkage mechanisms that cooperate to control the working units or tools of a mulcher and which linkage mechanisms are connected for regulating the positions of the transport wheels between lowered implement towing position and raised implement working position.

One of the objects of the present invention is to provide a tool carrying farm implement having a new and novel arrangement of interconnected power operated mechanisms that automatically respond to the workings of a hydraulic cylinder on the implement to retract the working tools and to lower the implement transport wheels into ground contact or to reverse this operation by bringing the tools into operative positions while retracting the implement wheels out of transportable position.

Another object of this invention is to provide a system of power operated control means that automatically transforms the apparatus of a farm implement between operative active ground working relation to non-active transportable relation while causing simultaneous tool adjustments corresponding to operative ground working positions and to inert inoperative positions, all made possible without requiring an operator to leave his seat on a pulling vehicle that is towing the implement.

In an implement that is convertible from an inactive towing or transportable position to a ground working position, it is necessary to provide towing or hitch means on the implement to accommodate both of the positions mentioned. The tongue must be free to move or swing vertically while the implement is working the ground and the same tongue should be locked against such motion when the implement is in rigged transport position.

It is, therefore, another object of the present invention to incorporate certain automatic mechanism that is arranged to stabilize the towing tongue against motion relatively to the implement and to free up the tongue for motion relatively to the implement when the implement is converted from free transport position into active ground working position.

While the invention is generally applicable to other similar implements for tilling the ground, the invention is of more specific application to a mulcher which carries a combination of roller assemblies and spring tooth means that all cooperate to obtain a uniform and finely compacted seed bed.

In a mulcher of this character, therefore, it is another object of this invention to provide automatic means for the specific operation and control of the spring teeth and to include adjustable manual regulatory means to selectively control the operation of the teeth for given depths of ground penetration under operative working conditions.

As a further object, this invention includes selective regulatory means that not only adjusts the maximum working penetration of the spring teeth into the ground, but which regulatory means is also incorporated into the implement operating mechanisms to act to retract the teeth into given transportable raised and inoperative positions when the implement is so rigged, and to also extend or depress the teeth into their same preselected depth positions each time the implement is again brought into operative ground tilling condition.

In the operation of the spring teeth in a combination roller and toothed mulcher, it is also desirable to provide a predetermined sequence of operation of the teeth during the change over of a wheel supported mulcher from ground working to transportable position and vice versa.

Another object, therefore, is to provide a system of control mechanisms in a wheel mounted mulcher that will automatically pull the spring teeth out of the ground before the mulcher is raised off the ground by the supporting wheel means. Conversely, the same object is extended by providing a means that will lower the implement to ground working condition while raising the supporting wheels into a raised position, and which will redirect the spring teeth into the ground at a time when the wheels are entirely out of contact with the ground. In other words, the teeth perform in a delayed action sequence that is efficiently beneficial to the operation and control of a wheel mounted implement that comprises roller sets in combination with spring teeth sets all contributing to good tillage results.

The automatic mechanism of the present invention includes a conventional hydraulic cylinder of a given standard stroke that is connected to operate all of the mechanisms of the implement through given cycles of action to achieve definite results. The power cylinder is a two-way or double acting type. In the herein disclosed implement, the cylinder is mounted upon the implement frame and its piston rod connects with the operating mechanisms of the implement. As the cylinder is installed, when the piston rod is extended, the spring teeth are retracted out of the ground and the implement transport wheels are lowered to the ground to raise the implement into a transportable mobile position. When the piston rod is again retracted, the transport wheels are raised and the spring teeth are forced into the ground.

Since the cylinder is provided and installed to function as described immediately above, and as also previously mentioned the teeth are first to retract out of the ground, it is another object of this invention to provide a power cylinder that is connected to retract the teeth at the initial operation of the cylinder piston stroke before raising the mulcher off the ground to thereby establish or develop one workable arrangement having one position wherein it is possible to raise the teeth without raising the mulcher off the ground. This particular feature of the mulcher permits an operator to dispose the implement teeth in raised position while crossing grass waterways, making turns at the ends of the run, clearing trash from the teeth, and when working in fields where soil conditions vary. With the teeth retracted out of working position, it is also possible to use the mulcher as a roller as will be readily apparent to those skilled in the art.

With the simple available means herein employed to raise the spring teeth at will and with ease, the life of a mulcher or other similar implement having ground working teeth will be considerably lengthened by the diligent use of the teeth raising means by an operator whenever sharp turns are executed with such an implement.

Thus the implement of this invention has two transportable positions available. One is with the wheel mounted equipment in operation and the other is with the implement lowered and riding upon its roller equipment. The latter position obviously coincides with the operative ground tillage position.

Other objects and advantages relating to the automatic mechanism herein disclosed for operating a wheel supported mulcher shall hereinafter appear in or become apparent from the following detailed description having reference to certain preferred forms of the invention illustrated in the accompanying drawings forming a part of this specification.

Figure 1:
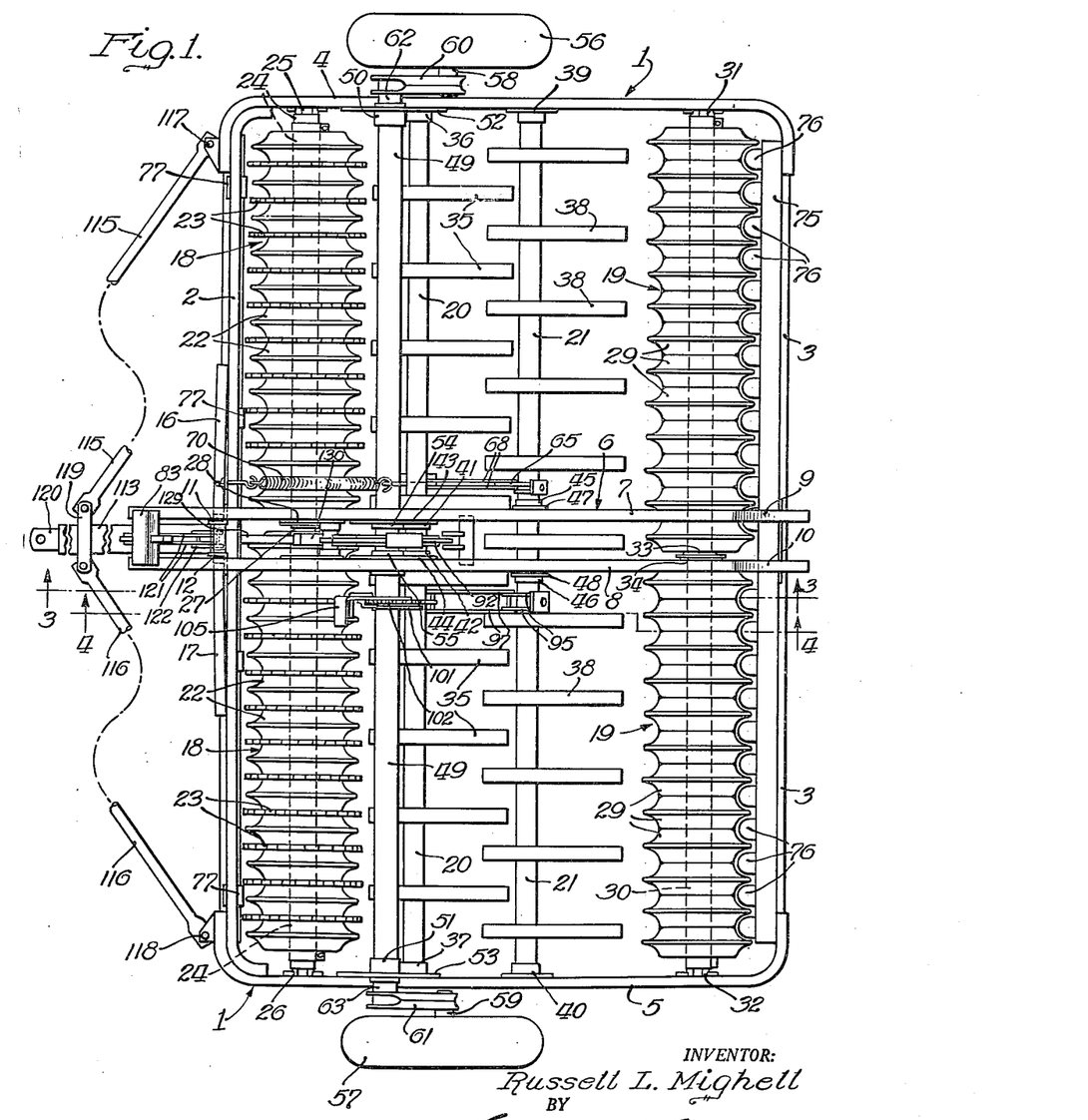
FIG. 1 is a top plan view of an agricultural implement embodying the new and novel mechanisms of the present invention.

With reference to FIG. 1, the implement there illustrated comprises a mulcher, structurally quite simply assembled, and incorporating the various interconnected linkage and control mechanisms that together cooperate to provide the different operational functions that are inherent in this mulcher and which were devised for the purposes expressed in the objects hereinbefore noted.

Figure 2:
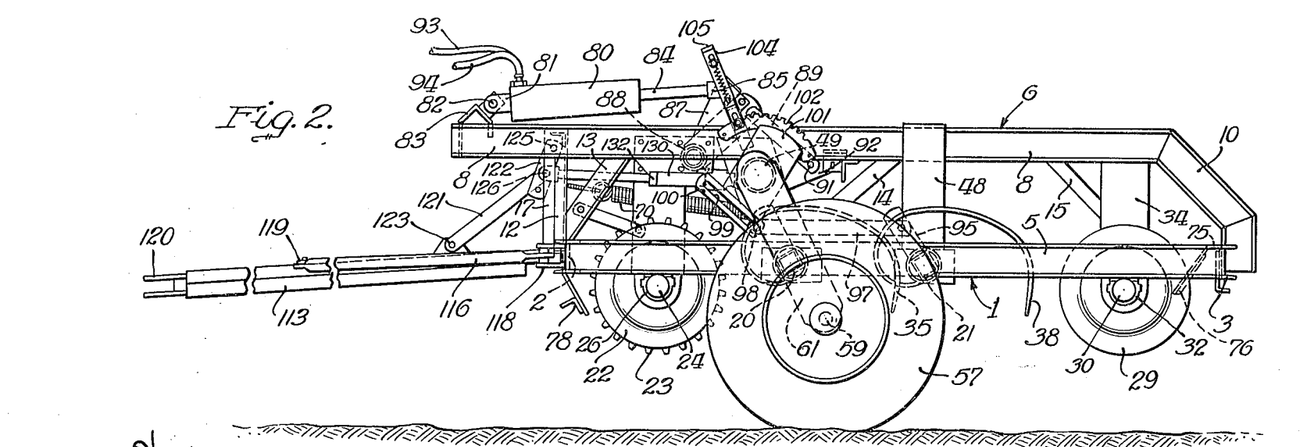
FIG. 2 is a side elevational view of the implement in FIG. 1, the same being illustrated as the implement appears when rigged in raised and transportable towing relation riding upon the lowered transport wheel equipment.

The implement is generally outlined by a rigid rectangular perimeter frame 1 comprising front and rear structural members 2 and 3 connected at their ends with side channels or structural members 4 and 5. An overhead central fore and aft frame 6 is supplied providing closely spaced beams 7 and 8 connected with member 3 by the downsloped ends 9 and 10, the front ends of beams 7 and 8 including vertically arranged braces or angle iron supports 11 and 12 for each beam 7 and 8. Fore and aft stability of frame 6 is established with suitable braces such as 13, 14 and 15 as best illustrated in FIG. 2. Diagonally arranged transverse braces 16 and 17 are connected between laterally spaced positions on the structural frame member 2 and the upper portions of supports 11 and 12 adjacent beams 7 and 8. Braces 16 and 17 thus enhance the lateral stability to frame 6.

The perimeter frame 1 carries fore and aft assemblies 18 and 19 of roller wheels on transverse axes and two intermediate tooth carrying rock bars 20 and 21 that also rotate on transverse axes.

The front roller assembly 18 comprises alternately arranged roller wheels 22 and sprocket wheels 23 that are all journaled upon a tubular shaft 24 supported from the perimeter frame by end bearings 25 and 26 supplemented with a central bearing 27 carried by a plate 28 depending from the overhead frame 6.

The rear roller assembly 19 comprises a plurality of roller wheels 29 journaled upon a tubular shaft 30 that is supported by the perimeter frame bearings 31 and 32 plus a central bearing 33 carried on a plate 34 that is connected with frame 6 in depending relation thereto.

The forewardly positioned rock bar 20 carrying multiple spring teeth 35 is journaled at its ends in bearings 36 and 37 mounted upon sides 4 and 5 of the perimeter frame 1. Similarly, the rearwardly positioned rock bar 21 carries multiple spring teeth 38 and this bar is journaled at its ends in bearings 39 and 40 mounted upon the sides 4 and 5 of the perimeter frame 1. Suitable central bearings 41 and 42 are carried on plates 43 and 44 secured to beams 7 and 8 and provide means to journal the central part of the spring tooth rock bar 20. Other bearings 45 and 46 are mounted upon plates 47 and 48 secured to beams 7 and 8, and these bearings journal the central part of the spring tooth rock bar 21.

The perimeter frame 1 is further adapted for the support of the transport wheel assembly comprising a cross shaft 49 rockably journaled in aligned bearings 50 and 51 mounted on plates 52 and 53 that are secured to the side frames 4 and 5 of frame 1. A pair of intermediate bearings 54 and 55 receive shaft 49 therethrough and these bearings are mounted upon the plates 43 and 44 that are connected with beams 7 and 8 of the overhead frame structure 6.

A pair of transport wheels 56 and 57 are carried upon aligned axles 58 and 59 secured to arms 60 and 61 that are rigidly fastened to projecting end portions 62 and 63 of the cross shaft 49. With this construction, rotation of shaft 49 will swing wheels 56 and 57 along arcuate paths in a given relation to the perimeter frame 1 and into different vertical positions in relation to the horizontal position of the frame with respect to the ground.

The fore and aft wheel units or roller assemblies 18 and 19 provide the supporting elements for the mulcher when the implement is in ground tilling position. The manipulation of the ground transport wheels 56 and 57 about the axis of their common shaft 49 will rig the implement for tilling when supported on roller assemblies 18 and 19 or for transport with the entire implement riding out of ground contact and so situated upon the two wheels 56 and 57.

The positions of the spring teeth 35 and 38 are normally controlled in unison for concerted action for ground penetration or for withdrawal. Suitable control mechanism is provided for operating the rock bars 20 and 21 as will later be described.

Figure 7:
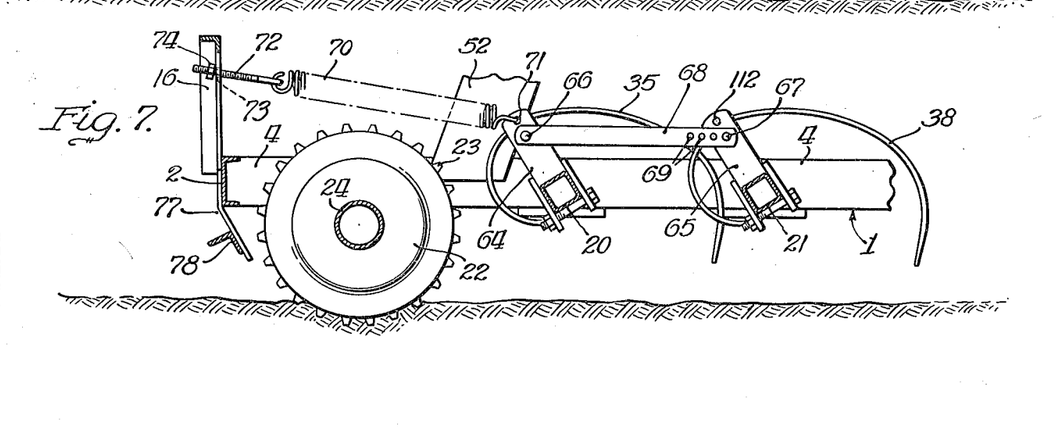
FIG. 7 is a detailed side elevational view of certain of the coating parts of the implement having to do with the operation of the spring teeth of this particular device.

With reference to FIG. 7, it should be noted that the rock bars 20 and 21 are each provided with arms 64 and 65 having pivot pins 66 and 67 to receive the ends of a connecting or tie link 68, which structure will cause the bars 20 and 21 to move or rock together. Link 68 may include other pin openings 69 for adjusting the relative angular positions of the arms 64 and 65 through the link pin 67 if changes in relative tooth angularities may be deemed desirable for certain conditions of use of the implement in tilling a field.

As further illustrated in FIG. 7, a tension spring 70 is hooked through an aperture 71 in the arm 64 and the opposite end of the spring 70 is looped through the eye or hook end of an adjustable threaded rod 72 that extends through an opening 73 in brace 16 and rod 72 carries an abutment nut 74 to secure spring 70 under a given expansible tension. With the described arrangement, the rock bars 20 and 21 together with their associated or connected spring teeth 35 and 38 are normally urged in a counterclockwise relation as viewed in FIG. 7 which would correspond to the action that is necessary to retract the teeth from ground contact or penetration. Any action to move or rock the bars 20 and 21 would have to be exercised in a clockwise relation and against the force of spring 70 to bring the teeth into ground contact.

The perimeter frame 1 also includes a rear bracket 75 having individual scrapers 76 for servicing the peripheries of the roller wheels 29. The forward or head end of the frame 1 is provided with depending brackets 77 that carry a leveling bar 78 which normally functions to level off or scrape away the high spots off of ground clods or litter lying on a field and during the operation of the mulcher.

*Wheel raising and lowering mechanism*

The mechanism employed to raise and lower the transport wheels 56 and 57 comprises a standard type of 8 inch stroke double acting hydraulic cylinder 80 having its base yoke 81 connected by a pivot pin 82 with a pin bracket 83 supported across beams 7 and 8, and in a forward outboard fashion at the top and head end of the implement. The cylinder piston rod 84 has a yoke 85 connected by means of a pivot pin 86 with a plate arm or lever 87 that is rockably journaled on a stub shaft 88 that is suitably carried by beams 7 and 8. A link or arm 89 is pin connected at 90 with plate arm 87 and pin connected at 91 with the outer end portion of a crank arm or rock plate 92 that is radially secured to the wheel shaft 49 and in a transverse plane thereof.

Under activation of cylinder 80, the cylinder rod 84 acts through plate arm or lever 87 to move the second connected link 89 for rocking the wheel shaft lever or arm 92 which then revolves shaft 49 and swings the wheels 56 and 57 about their implement axis. With this construction the wheels are, therefore, under full and positive control of the cylinder.

Figure 4:
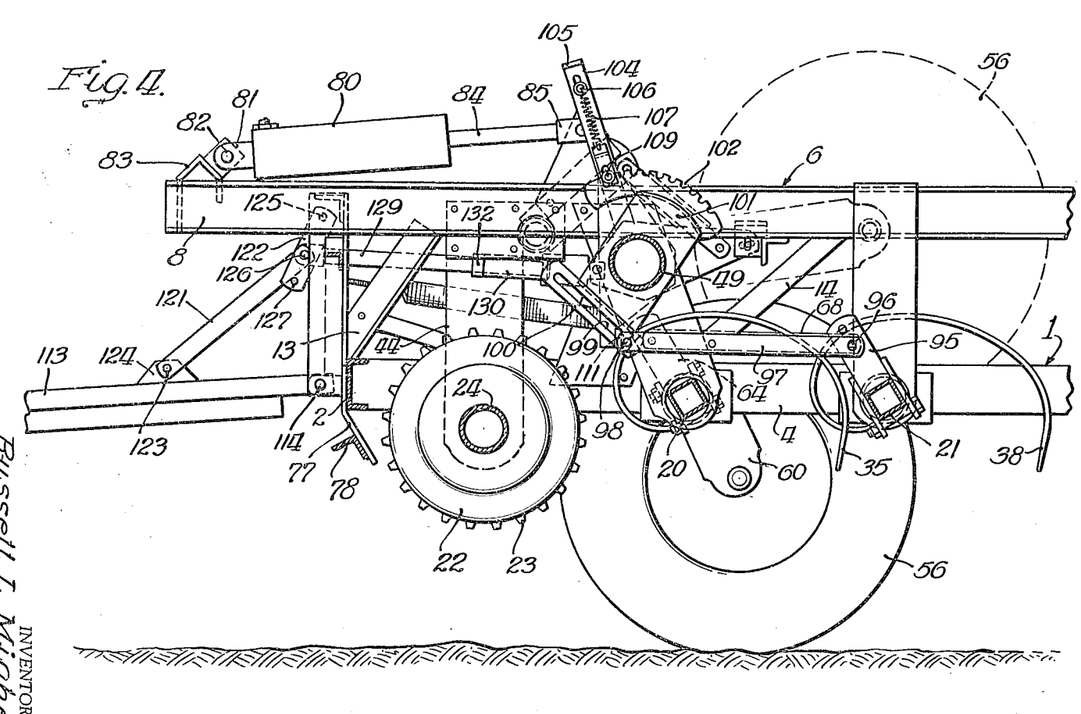
FIG. 4 is another vertical cross sectional view of a fragmentary portion of the implement substantially as taken along the plane of the line 4—4 in FIG. 1.
Figure 5:
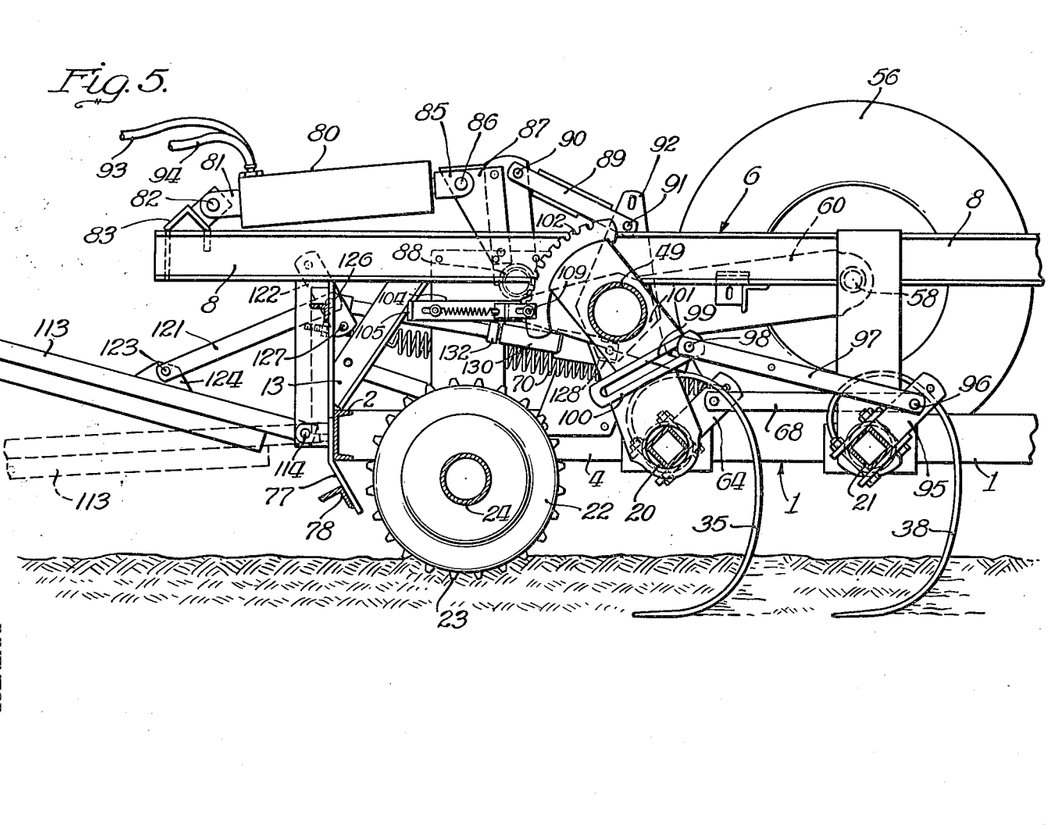
FIGS. 5 and 6 are sectional views similar to the FIG. 4 illustration, but each shows the implement parts as they appear when occupying different changed positions.
Figure 6:
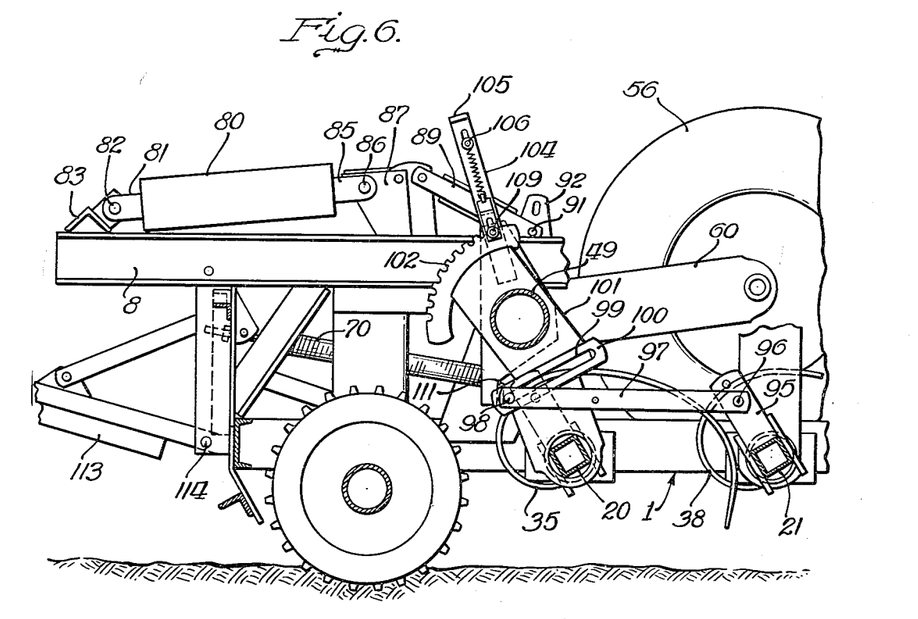

Power is supplied from a towing or pulling vehicle, usually a tractor, by valve controlled hydraulic fluid supplied through the conduits or hoses 93 and 94 that suitably connect with cylinder 80 in the manner illustrated in FIGS. 2 and 5. Thus, with this double acting cylinder 80 in a position on the implement and remote from the towing vehicle or unit, is is possible for an operator to manipulate the wheel arms and wheels 56 and 57 into positions to bring about the results desired. With the full stroke of cylinder 80, with rod 84 extended, the wheels 56 and 57 will be on the ground as in FIGS. 2, 3 and 4 providing the transport condition of the implement. With rod 84 fully retracted as shown in FIGS. 5 and 6, the implement is rendered wholly operative to till the soil. Certain intermediate positions of rod 84 extension or retraction will provide advantageous operation of the spring tooth bars to produce certain results.

*Spring teeth control and operation*

The bars 20 and 21 with their corresponding sets of spring teeth 35 and 38 respectively, are constructed to include a second link connection which is similar to the FIG. 7 apparatus, but which is well disclosed in FIG. 6.

Bar 21 is shown in FIG. 6 as being provided with another arm 95, secured to the bar, and having a pivot pin 96 to receive the adjacent end of a link 97. Link 97 has a laterally protruding pin 98 on its free end that is positively made to ride within a slot 99 in a guide plate 100 that forms a part of a rock plate 101 which is welded or otherwise fixedly secured to the cross shaft 49 that connects with wheels 56 and 57 through arms 60 and 61 as best shown in FIG. 1.

Figure 8:
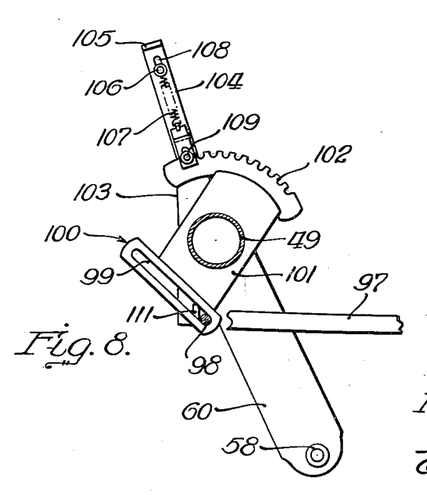
FIG. 8 is a fragmentary detailed side elevational view of the control plate assembly and latch locking connecting means all employed to establish selected preset depth regulation for the cultivating spring teeth used in the mulcher implement of this invention.

Rock plate 101 is best illustrated in FIGS. 5, 6 and 8 and is made to include a notched quadrant 102 disposed radially outwardly from the axis of shaft 49 and oppositely outwardly in relation to the outward location of the guide plate 100.

Figure 9:
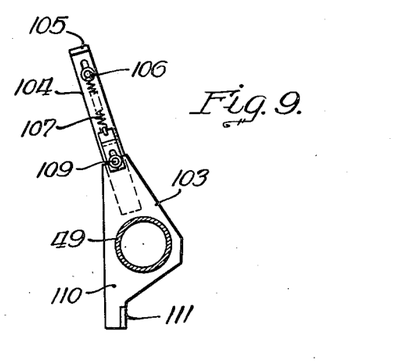
FIG. 9 is an other detail side elevation view of one of the control plate units of the depth setting structure used for the spring teeth, this plate unit providing the means that carries the latching structure that establishes and fixes the amount of tooth depth and ground penetration.

A control plate 103, best shown in FIGS. 5, 6 and 9, occupies an adjacent position out of the plane of the rock plate 101. This plate 103 is journalled for free pivotal movement upon shaft 49. The upper end of plate 103 has a bracket arm 104 provided with a hand grip overhang 105 that coacts with a hand rod 106 therebeneath. A spring 107 keeps the rod 106 downwardly in an elongated slot 108 in the bracket arm 104 and the rod includes an extension that follows arm 104 at the rear thereof and terminates with a reentrant latch tip 109 guided in another elongated slot in arm 104. Tip 109 is positioned transversely to the quadrant 102 to engage into certain of the teeth or notches provided along the outer peripheral edge thereof to receive the horizontal tip 109 as a latch means to position plate 103 in a given angular relation with respect to the rock plate 101.

By placing a hand upon the hand grip 105 and pulling up on the hand rod 106 with the fingers, the latch tip 109 is withdrawn from the notches in 102 against spring 107. Hand pressure on the latch handle arrangement exerted in an arcuate direction about shaft 49 can then be exercised to adjust the relative position of plate 103 in respect to plate 101 by latching into any one of the quadrant notch positions.

With further reference to FIGS. 5, 6 and 9, it should be observed that plate 103 has a radially arranged depending section or arm 110 that carries a stop lug 111 in an adjacent position behind the guide plate 100 and in the line of the slot 99. This arrangement also places lug 111 in the path of the pin 98 that is on link 97 and which pin rides in slot 99 of the rock plate unit 101.

Thus by changing the angular positions of the stop lug 111 in relation to the length of slot 99 by controlling the relative positions of plates 101 and 103 through the described latch and quadrant means, the free range of action of pin 98 along slot 99 may be selectively varied between given limits of operation. This will correspondingly vary the amounts of rotation of the spring teeth with bars 20 and 21 as further governed by the positions of the transport wheels 56 and 57 as they are bodily swung by means of their own supporting shaft 49 and through their respective arms 60 and 61.

It is the lug 111 that determines the slot length through which pin 98 may move under condition of operation. Lug 111 also supplies the depth control instrumentality to establish the maximum depth of ground penetration of the spring teeth 35 and 38.

It must be understood that there are two separate forces acting upon the rock bars 20 and 21 that tend to rotate such units in counterclockwise rotation. The tension spring 70 provides a continuous pull to urge the spring tooth units toward or into retracted positions and in counterclockwise directions. The second activating force is the entire tilling load force on the two sets of teeth that tends to move all of the teeth rearwardly in a direction to rotate the rock shafts 20 and 21 in counterclockwise directions. Both of the above situations are controlled by the reaction of pin 98 guided in slot 99 against the face of the lug 111 whereby the positions of the teeth are stabilized according to the notch selection made by the operator in preadjusting the latch means handle structure to fix plates 101 and 103 in predetermined relative locations.

Referring once more to FIG. 7, it should be noted that the teeth and bar assemblies do have maximum retracted and stopped positions as determined by limit means or locking means. Such limiting or locking mechanism is provided by the use of a pin 112 that projects from the near side of arm 65 to move in the plane of operation of the connecting or tie link 68. When the spring teeth units are fully retracted by the control linkage to the spring 70, pin 112 comes in contact with the upper edge of the link 68 and counteracts any further counterclockwise motion of the rock shafts 20 and 21, and their associated spring teeth. At this maximum limit stop position and for some appreciable amount of rotational motion of the spring teeth prior to this last position, no more ground drag is imparted to the teeth except perhaps for an occasional contact with a large earth clod or piece of ground debris.

Stop 112 thus not only acts as a predetermined maximum retraction means for the tillage tools, but as in the case with the spring teeth here employed, the stop prevents the front teeth 35 from accidentally snapping over the rear rock bar 21 or other structural parts thereof which would lead to damage and inoperativeness of the implement. Stop 112 does not in any way interfere with the slot and pin means control device for regulating the movements of the tools as hereinbefore described or with the further explanation to follow regarding the control means.

In the FIG. 4 illustration, the implement is rigged for transport with the transport wheels 56 and 57 down. In this view, the latch means is adjusted for maximum tooth penetration depth, using the first notch of quadrant 102. Lug 111 is in a position to substantially hold pin 98 at the right hand end of slot 99 as though it were pivoted in that position.

Retraction of the cylinder 80 will then raise the transport wheels and lower the implement upon the ground rollers while simultaneously rotating the rock bars 20 and 21 to swing their teeth 35 and 38 into maximum ground penetration positions as shown in FIG. 5.

Any intermediate setting of the latch means in relation to the notched quadrant will expose more of slot 99 to pin 98 and the latter will naturally react against the new position of the lug 111 to permit some further retraction of the teeth counterclockwise for lesser ground penetration when the implement is lowered into its operative ground tilling relation. Reverse operation of the implement to raise the same for transport will always be accompanied by a retraction of the teeth to the same raised positions and as best indicated by the FIG. 7 illustration of the mechanisms there shown.

Should the implement operator wish to eliminate the use of ground engagement with the spring teeth, the hand latch means can be adjusted as shown in FIG. 6, latching into the last right hand notch on the quadrant 102. With this setting, the pin 98 can merely ride in slot 99 over the entire length thereof in spite of the operation of the raising and lowering mechanism of the implement to manipulate the transport wheels. This particular relationship of the linkages allows the implement to be converted for use as a roller tillage unit only and the spring teeth mechanism is rendered inoperative under this selected latched setting arrangement.

Tongue locking control

As previously briefly mentioned, the implement tongue must be freely vertically swingable during soil cultivation, while the tongue should be held in fixed position to the implement when the same rides in elevated position upon the transport wheels.

Figure 3:
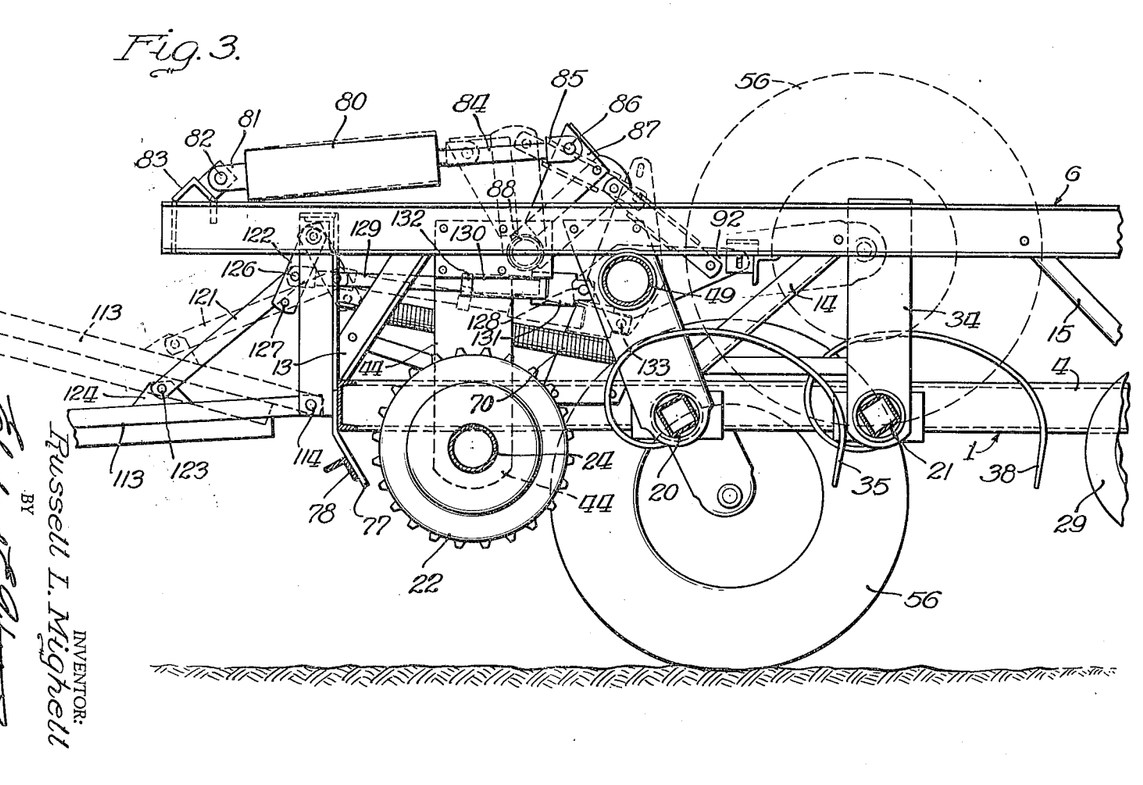
FIG. 3 is a vertical cross sectional view of a fragmentary portion of the implement substantially as taken along the plane of the line 3—3 in FIG. 1.

The tongue 113 as it appears in FIGS. 1, 2 and 3 is pivotally supported upon a cross pin 114 adjacent the front frame member 2 centrally of the implement. Diagonal stabilizing braces 115 and 116 are connected with frame brackets 117 and 118 and join with a common tongue bracket 119. The outer terminal end of the tongue 113 is provided with an apertured hitch clevis 120 for the usual attachment with a tractor drawbar or with other suitable towing means.

Automatically operable interconnected mechanism is interposed between tongue 113 and the wheel rocking shaft 49 to establish the tongue connections with the implement suitable for the conditions of operation of the implement.

This mechanism comprises a connected pair of toggle links 121 and 122. Link 121 has its forward end pivoted on pin 123 carried by tongue bracket 124. Link 122 has its implement end pivoted on pin 125 of frame 6, and both links are joined by a common pin 126. Link 122 is further provided with a limit or stop lock pin 127 that is placed for contact with the underside of link 121 to limit relative outward or forward motion between these two links beyond the positions thereof shown in FIGS. 2 and 3, wherein the implement is wheel mounted and transportable. Tongue 113 is held against downwardly swinging beyond the position shown in FIGS. 2 and 3 by the pin locked positions of the links 121 and 122.

A telescopic arrangement is connected between the links 121 and 122 and an arm 128 which is a tailpiece of the rock plate 92 that is secured directly to shaft 49 to swing therewith. This telescopic means comprises a rod 129 pivotally secured with the link pin 126 and having its free end riding in slidable condition within a tubular sleeve 130 secured to a support plate or web 131 that is pivotally connected to the arm 128 of shaft 49. A stop collar 132, which may be adjustably secured, is fixed in a predetermined position upon the rod 129 and provides abutment means to engage the end of sleeve 130 at a time when the transport wheels are down as in FIGS. 2 and 3. This provides a means to straight-arm the connected links 121 and 122 to prevent relative motion therebetween for rearward separation from their forwardly locked positions established by pin 127, thus preventing the tongue 113 from swinging upwardly upon its pivot pin 114 while the implement is rigged as in FIGS. 2 and 3.

When the implement is lowered for operable ground tillage, the tongue 113 may be swung as low as the position indicated in FIGS. 2 and 3. The top limit of swing of the tongue is substantially as shown in FIG. 6 and in broken lines in FIG. 3 which position is normally determined by the collar 132 when it again comes into contact with the end of the sleeve 130 which has been partially withdrawn relatively to rod 129 and rearwardly of the implement upon counterclockwise swinging of arm or lever 128 to a position such as shown in broken lines at 133 in FIG. 3. The swinging limits of the tongue are adequate to provide operative manipulation of the implement under normal conditions of tilling the soil with the mulcher illustrated.

Summary of operation

The purpose of the implement herein disclosed is to prepare seedbeds for planting crops subsequent to plowing. This mulcher implement functions to level, smooth and firm the soil for planting and it will usually do so in one trip over the field.

In operation, the leveling bar 78 scrapes off the high ground material and soil and the front roller assembly crushes and pulverizes the large lumps. This action is followed by the two transverse rows of spring teeth which uniformly cultivate the soil to a selected depth. The teeth pull the larger earth lumps, etc., to the surface while filling in the voids beneath them with finer particles. The rear roller assembly then finally crushes these secondary lumps to leave the worked over ground in smooth and firm condition ready for planting.

There are occasions when excessive sods, cornstalks, or other litter is lodged on or near the surface of the ground. Under these conditions, the litter may tend to collect ahead of the spring teeth failing to pass therebetween.

When the teeth become clogged full of such materials, further effective progress is futile and the litter must be removed.

The conventional practice has been for the operator to stop the tractor, get off and walk to the implement to regulate the adjusting levers to raise the teeth, and then return to the tractor to move the implement forward to clear the litter pile. The operator had to then again leave the tractor to reset the teeth to a selected depth with the hand levers before proceeding with the tilling of the ground.

With the construction of the implement of the present invention, an operator begins work on a field by setting the latching lever 104 in a given selected position to provide a predetermined depth of ground penetration by the spring teeth 35 and 38. The mechanism employed will function to always retract the teeth to a given raised position and to always return the teeth to their preset depth in returning the implement to ground working position. The raising and lowering of the implement is accomplished through the hydraulic cylinder 80 and link mechanism to swing the implement transport wheels between operative transport positions and inoperative raised or elevated positions.

With the implement of the present design and construction, an operator need not leave the tractor seat under conditions leading to the collection of litter and trash in front of the spring teeth. The operator merely touches the conventional hydraulic control lever to energize the implement cylinder 80 to slightly extend the rod or ram 84 thereof a small amount of its total stroke. This action is such as to lower the wheels 56 and 57 until they nearly touch the ground and in so doing the linkage means functions to simultaneously retract the teeth far enough to clear the litter and trash or to spread the same over a given area under continued forward motion of the vehicles. In other words, the excess piled up materials can be scattered over an adequate distance depending upon the amount and the kind of the material collected. Obviously, none of this material need be left in a concentrated pile on the field.

After the litter and trash is so distributed, the operator again flips the hydraulic lever to retract the cylinder rod or ram 84 to thereby reestablish the preset depth of the spring teeth to continue such cultivation of the ground. With this arrangement, the operator does not have to stop the tractor and he obviously does not need to leave the tractor to accomplish the steps explained.

Another factor of merit is the manner in which the teeth may be regulated under certain soil conditions. While the maximum depth penetration of the teeth can be initially selected and determined by an operator with the latch handle 104 moved to a given notch in quadrant 102, the soil conditions vary widely over a single field and best results may further be obtained by tilling the soil deep or tilling the soil shallow. This can also be brought about by manipulating the controls to cylinder 80 to vary the teeth penetration by an inch or more, for example, between the preset maximum depth and some raised position. All this is embodied into the implement by utilizing a given arrangement of linkages connected and operated from a double acting cylinder such as 80 having, in this case, an eight inch stroke in both directions. The entire control is from the operator's seat on the tractor to the remote cylinder on the implement as projected through the combination of interconnected mechanisms hereinbefore described that manipulate the various pertinent assemblies of the mulcher.

The operation of the mulcher includes another feasible function that is possible with the described apparatus. There are times when it is desired to only roll the ground and to keep the teeth out of action and in raised positions. This condition is readily provided by shifting the adjusting lever or latch means to the last notch on the quadrant to occupy the position illustrated in FIG. 6. This shifts the stop lug 111 substantially out of range of the slot 99 accommodating pin 98 so that the latter has the entire free range of slot 99.

Under this particular setup, the implement can be operated for roller ground contact only and the transport wheels 56 and 57 can be raised and lowered with no effect on the spring teeth which remain retracted under the action of the tension spring 70.

*Modified arrangement*

Figure 10:
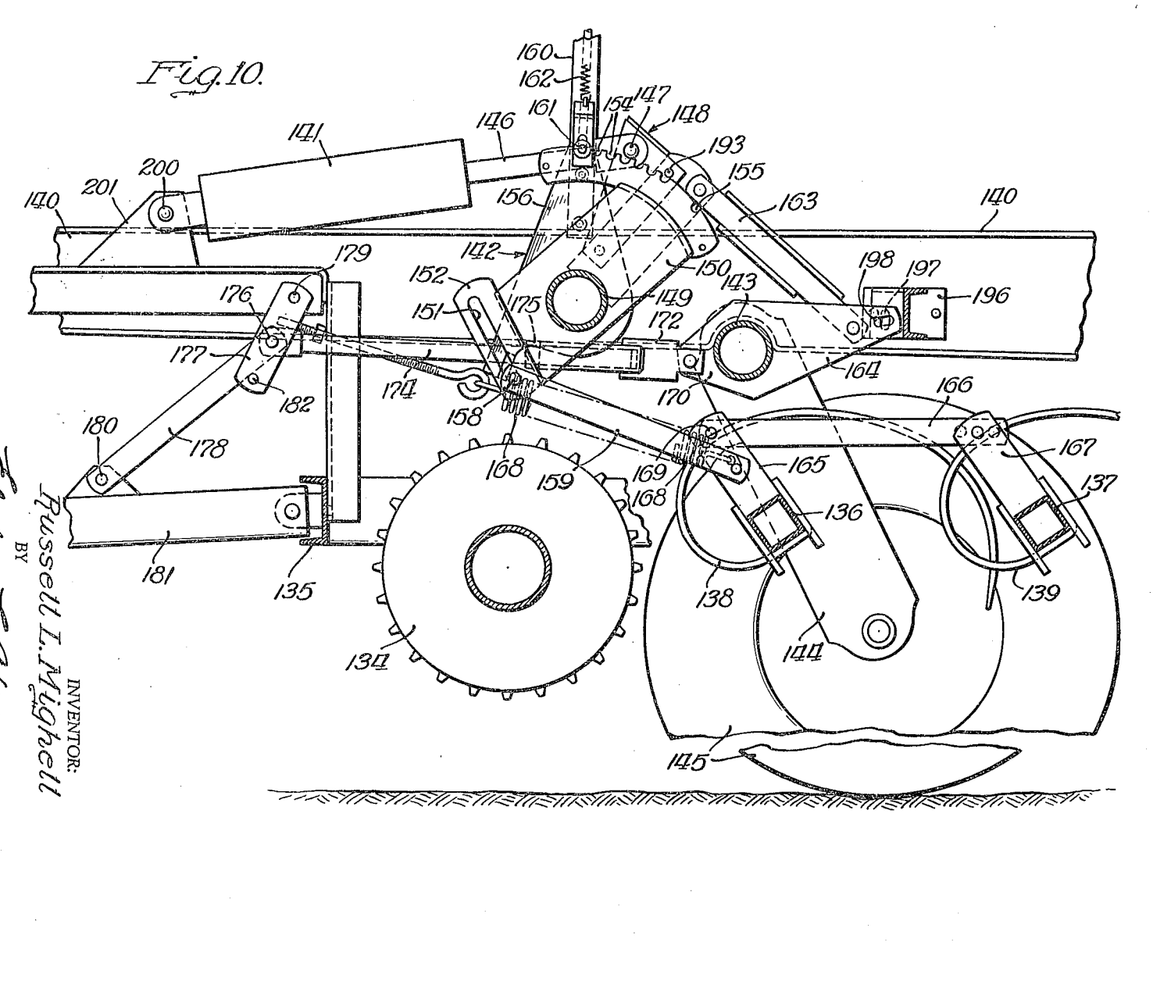
FIG. 10 is a fragmentary longitudinal sectional view taken on a vertical plane of a modified arrangement of implement including some structural differences providing certain other beneficial and advantageous results in a mulcher of this type, this view showing the implement as rigged for transport.
Figure 11:
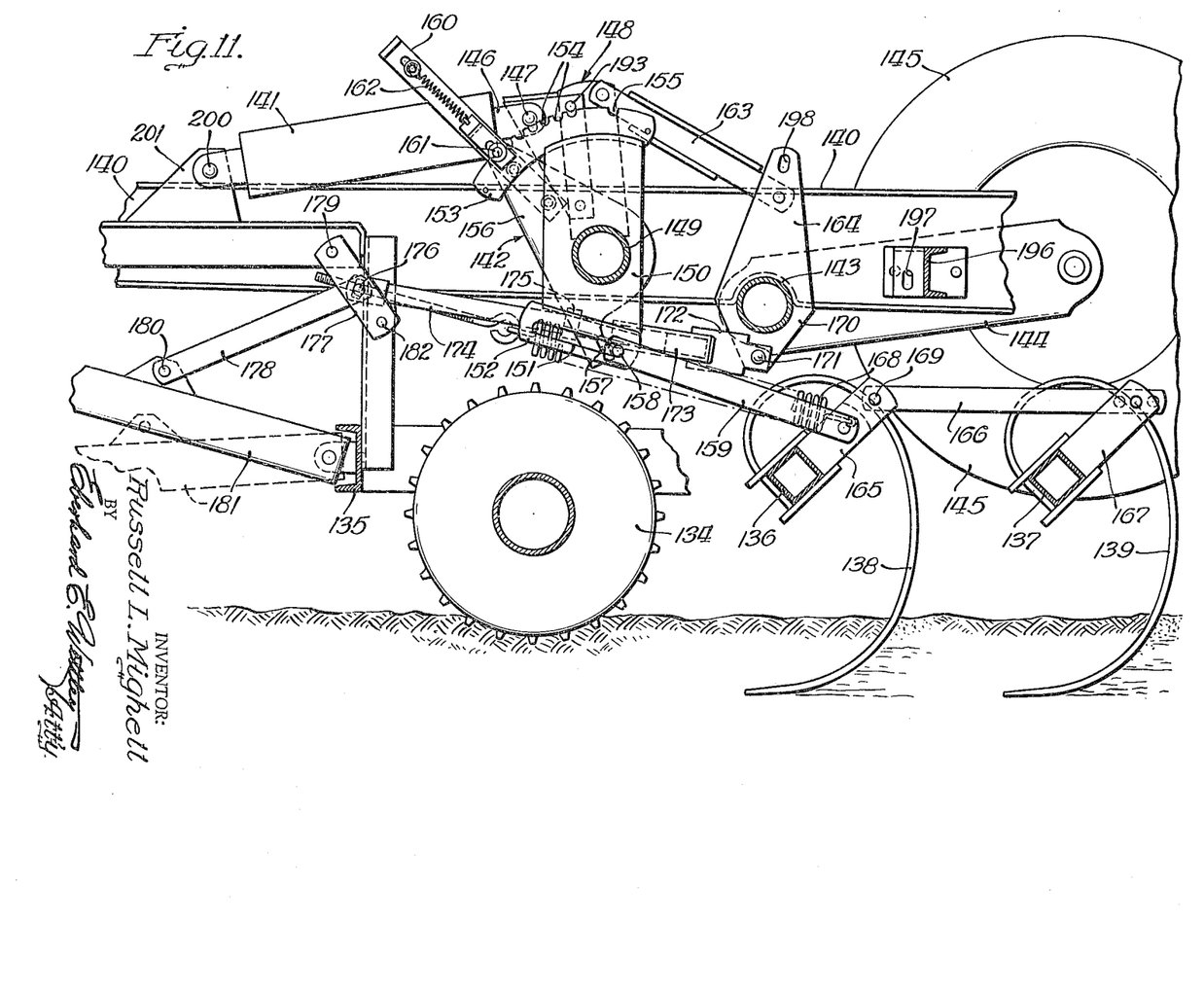
FIG. 11 is a view similar to FIG. 10 with the implement parts shifted and shown in operative ground tilling relation with the transport wheels retracted or raised to inoperative positions.

FIGS. 10 and 11 depict another arrangement of interconnected linkage mechanism and power apparatus that coact to bring about the same general operational functions that were possible with the initially described form of the invention.

In this implement, the regulator or present adjustment mechanism is independently carried or supported upon the frame in spaced relation to the wheel arm carrying frame of the implement. The linkage mechanism leading from the regulatory preset means is also differently connected with the two rock bars carrying the sets of spring teeth.

The general construction includes forward rollers 134 connected with the main frame 135, the rearward rollers not being shown, with a pair of rock bars 136 and 137 also being suitably carried by frame 135 for the support of the individual sets of spring teeth 138 and 139. As in the other structure, an overhead frame 140 provides the support for the hydraulic cylinder 141, the adjustable regulatory preset mechanism 142 and the transport wheel shaft 143 for the wheel arms 144 connected with the wheels 145.

The cylinder ram 146 is connected with a pin 147 of the swinging arm assembly 148 secured to the tubular rock shaft 149 that also fixedly supports the quadrant carrying plate 150 providing a link pin slot 151 in the base plate 152 and a latch quadrant 153 having seven preset notches 154 and a spring tooth orientation notch 155.

A movably mounted latch plate 156 is freely journalled upon shaft 149 and supports a gauge lug 157 that cooperates with the slot 151 to control the available slot space for the link pin 158 on link 159. The adjustable handle 160 includes the latch 161 that is held downwardly into a selected notch on the quadrant 153 by means of spring 162.

The transport wheel actuating mechanism comprises a link 163 connecting the arm assembly 148 with the plate arm 164 that is mounted upon and secured to shaft 143. Thus the motion of the hydraulic cylinder is transmitted to the wheel structures from the ram 146, arm assembly 148, link 163, to the arm 164 to rock the tubular shaft 143 and the connected arms 144 and wheels 145.

The previously described link 159 varrying the control pin 158 is pivotally connected at its rear end with crank arm 165 secured to the rock bar 136. Another link 166 connects crank arm 165 with the crank arm 167 carried in fixed relation to rock bar 137. A tension spring 168 connects with arm 165 to urge the same and the crank arm assembly in counterclockwise direction. The pin 169 protrudes and provides a fixed stop to engage against the top edge of link 159 under the action of the spring and whenever permitted by the placement of lug 157 under certain adjusted conditions of operation.

This implement is also provided with a tailpiece 170 on plate arm 164 having pin 171 connected with plate or web 172 that carries the sleeve 173 which rides upon the free end of the rod 174 supplied with the stop collar 175. Rod 174 is pivoted on pin 176 on link 177 and the same pin 176 pivotally receives the rear end of the tongue link 178. Link 177 pivotally depends from the pin 179 on frame 140 and the front end of link 178 is pivoted on a pin 180 on tongue 181. And link 177 is provided with a toggle limit pin 182 for links 177 and 178, the pin being arranged to engage the lower edge of link 178 when the transport wheels are lowered.

The implement in FIGS. 10 and 11 provides the same general operative mechanisms to carry out the objects of this invention. The modified construction includes certain further advantages and facilities made possible with the new placement of the regulatory means 142.

The implement in FIGS. 10 and 11 provides an independent rock shaft 149 for the regulatory mechanisms 142 that control the swinging motions of the spring teeth 138 and 139. With this setup, the mulcher may be supplied without the wheel mounted feature including linkages 163—164, tubular shaft 143, bearings on frame 135 for 143, swinging arms 144 and the wheel assemblies 145. With the elimination of this structure, the tongue locking apparatus can also be dispensed with since a rigid tongue is generally not required in an implement that is not transportable with auxiliary wheels. The unit so constituted would ride on its fore and aft roller assemblies carrying the tooth structures and operating mechanisms in direct operative relation thereto.

Figures 12, 13:
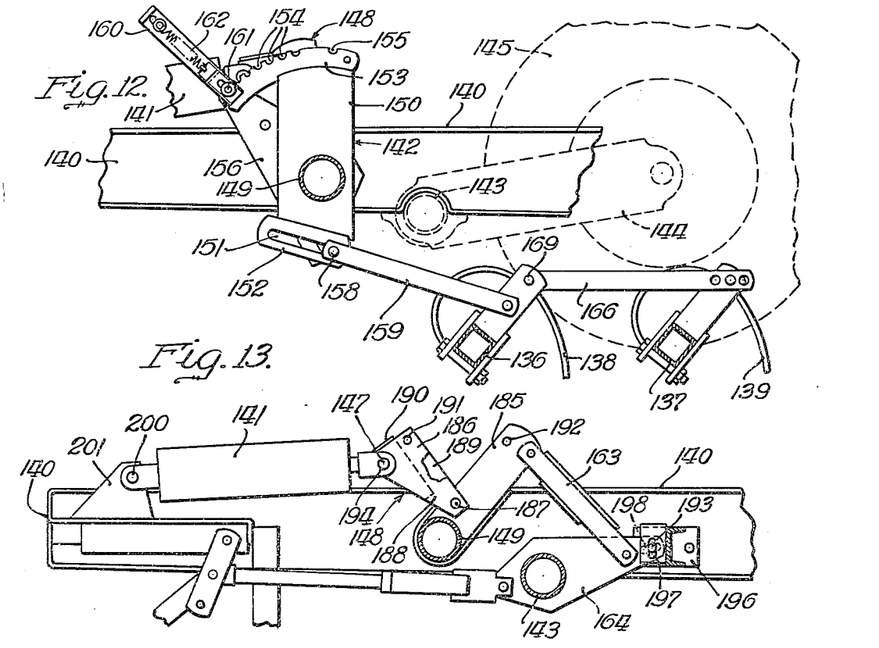
FIG. 12 is a schematic view of certain of the salient connected parts of the modified implement to better illustrate a converted arrangement of the mulcher eliminating the transport wheel apparatus and the tongue locking mechanism.
FIG. 13 is a detailed view of certain of the connected linkages to further illustrate the means employed to facilitate inchangeability of the power cylinder and its manner of installation.

The arrangement just described may be better visualized with reference to FIG. 12 which more or less diagrammatically demonstrates the non-wheel mounted assembly. The same double acting cylinder 141 is employed and the tilling functions still prevail, but all without the wheel mounted feature.

Another advantage developed in this modified form is that it is possible to provide a better linkage arrangement which permits a simplification of the tooth bar linkages. Thus links 159 and 166 are disposed substantially in line between rock arms 165 and 167, and with their front end pin 158 connection with slot 151 of unit or quadrant carrying plate 150. The load reactions on teeth 138 and 139 are better absorbed and accommodated through the generally aligned linkage discussed. In the first form of the invention, the load is transferred from the head end tooth bar to the rear tooth bar with one linkage and then from both bars to the slot plate unit through stil another linkage.

*Cylinder installation*

One other improved structural feature embodied into the implement of the present design may best be explained by reference to FIGS. 10, 11 and 13. This same apparatus is also used in the first form of the implement disclosed in FIGS. 1 to 9.

As is the usual practice, a power cylinder such as 141 is universally adapted for operation in other farm implements and mechanisms needing such a power device. With this in mind, the implement has been constructed with a novel linkage that enhances the installation and removal of the power cylinder and makes this act a simple expedient matter.

In FIG. 13, the swinging arm assembly 148 is shown as comprising a selectively separable two piece unit having a lever arm 185 in the form of a plate rigidly secured to the rock shaft 149 and this plate arm pivotally supports a swinging arm 186 upon a pivot pin 187 for relative movement with respect to arm 185. The swinging arm 186 is constructed with a pair of plates 188 and 189 secured to and separated by a plate spacer 190 which also forms an abutment member to engage the near edge of arm 185 when arm 186 is rotated clockwise against lever arm 185. Under abutted conditions, the openings 191 and 192 in the dual arm parts are aligned and a removable securing pin 193 is inserted through such openings to make the dual arm a single rigid unitary assembly bodily rotatable with shaft 149. The swinging plate arm 186 has another opening 194 to receive the ram clevis pin 147 which is designed for easy removal and replacement. Actually the securing pin 193 is transferable and it is also used to lock the plate arm 164 to bracket 196.

A further cooperative mechanism is needed to bring about the cylinder interchange. This mechanism comprises the bracket 196 secured to the frame 140 in a position to supply an opening 197 that lies in the path of an opening 198 provided in the swinging end of the plate rock arm 164 supported upon shaft 143.

Under operating conditions, after a field tillage job is concluded, the cylinder 141 is actuated to extend the ram to bring the transport wheels 145 down to raise the entire mulcher. In this position, the mulcher parts are as in FIG. 10, which brings the end of the rock arm 164 in a spot wherein openings 197 and 198 are in line. For greater latitude both openings 197 and 198 are made in the form of elongated slots of limited extent to receive the lock pin 193 therethrough whereby to secure the rock arm 164 against swinging and to hold shaft 143 in fixed relation with the wheels 145 locked in position for transport duty. Pin 193 is removed from the dual arm assembly to be used as a lock pin.

When the parts described are so locked, the ram pin or cross shaft 147 can be withdrawn and the cylinder 141 removed by the further extraction of the cylinder base pin or shaft 200 from bracket 201 on frame 140.

The above removal is readily made because the cylinder 141 was positioned with its ram 146 extended as described. Upon subsequent reinstallation of the cylinder, the ram 146 may be fully retracted or it may be lodged in some intermediate extended position. When the cylinder is so constituted, there is no need to first couple it to some hydraulic power source for the regulation of the ram for purposes of obtaining the necessary pin connections. The operator need only withdraw pin 193 out of the composite lever arm 148 and swing the plate arm 186 about its pivot pin 187 in a direction to meet and align the opening 194 with the ram opening for the reception of the clevis pin 147. Obviously the cylinder is first secured with its base end securely pinned to bracket 201.

After these connections and operations are completed, the cylinder can be actuated to bring arm 186 against lever 185 and pin 193 can then be withdrawn from the aligned bracket opening 197 and lever opening 198 to unlock these units. Then pin 193 is transferred and inserted through the openings 191 and 192 in the coacting members 186 and 185 completing the reinstallation of the cylinder. This again places the entire mechanism under the full control of the hydraulic cylinder 141.

This concludes the general description relating to the mechanisms employed to fulfill the inventive concept of this invention and to perform the various results obtained.

Figure 14:
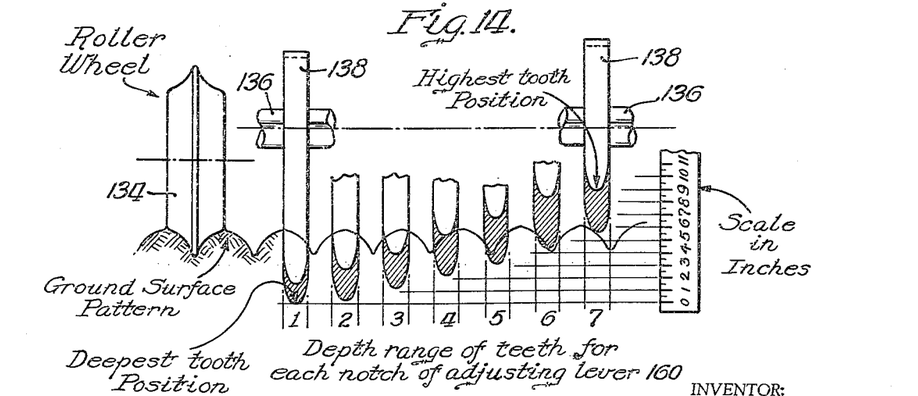
FIG. 14 is a composite diagrammatical view of the range and manner of operation of the spring teeth units of the mulcher as oriented with the different preset selections of the control mechanism devised for this purpose.

As a matter of further clarification, FIG. 14 has been added to better illustrate some of the operative positions of the teeth as they are manipulated by the mulcher control apparatus. Seven different tooth positions are diagrammatically shown which conform with the seven notches in the latch quadrant according to the settings of the latch means shown in FIGS. 10, 11 and 12. The same or similar conditions are established with the mechanisms described in FIGS. 1 to 9.

The legends supplied in FIG. 14 are for the greater part sufficient to interpret and understand the theory of operation and control of the teeth. The crosslined positions of the teeth are the maximum down locations for each selected preset depth. The unlined teeth indicate the amount of vertical adjustment that is possible for each position of the individual teeth at the notch settings shown and under conditions during which the transport wheels are lowered until they come to the ground level.

In all latch lever adjusted positions, the teeth will automatically retract to the unlined #7 position which provides the maximum road clearance elevation for transport. The crosslined #1 position is the maximum tooth depth obtainable as considered in relation to the roller arched ground surface line shown in FIG. 14.

Some variations in tooth positions will be encountered in actual operation due to the flexing of the spring steel teeth as determined by the implement forward speed and soil conditions. But for all practical purposes, FIG. 14 well depicts the action of the teeth and their respective relations to the ground.

While the description has been confined to the forms of the invention disclosed in the drawings as specific examples of reductions to practice, other changes and variations are contemplated in the various elements employed and in their specific combinations. The extent of such modifications shall, however, be governed by the breadth and scope of the language contained in the following claimed subject matter directed to the salient features of the present invention.

What I claim is:

1. An agricultural implement comprising, in combination, a frame, rotary ground working assemblies secured in positions on said frame to orient said frame in a given elevated relation to the ground, rock bars pivotally supported on said frame, spring teeth on said bars for ground cultivation, and control mechanism carried by said frame and operatively connected with said rock bars to manipulate said spring teeth between predetermined selected positions with respect to the frame and in relation to the surface of said ground, said control mechanism comprising a first interconnected linkage joined with said bars to rock the bars, a second interconnected linkage, a power unit to actuate one of the linkages, and cooperative means interposed between said linkages, comprising a rockable member pivotally supported on said frame and having connection with one linkage, said rockable member having an elongated slot therein, and a pin member connected with the other linkage and disposed to ride within said elongated slot for movement therealong, said rockable member providing the actuation means under control of said one linkage to impart motion to the other of said linkages and the rock bars with their spring teeth through the instrumentality of the operation of said pin member within the slot of said rockable member, the limits of motion imparted to said rock bars being governed by the available length of the slot in said rockable member.

2. An agricultural implement as in claim 1, with the addition of a regulatory mechanism having adjustable connection with said rockable member and including a stop lug thereon movable to selected positions along the elongated slot in said rockable member, said regulatory mechanism providing means to limit the available motion of said pin member on said other linkage in a direction toward the slot end that normally establishes maximum ground penetration of said spring teeth.

3. An agricultural implement as in claim 1, wherein said rockable member and said regulatory mechanism include separable parts providing latch means comprising a swinging handle on one of said parts having a latch element, and a notched quadrant on the other of said parts to receive the latch element, whereby different latched settings of said parts dispose said stop lug in different operative positions along the length of the slot in said rockable member to determine selected depth penetration positions for said spring teeth of said rock bars.

4. An agricutural implement as in claim 1, with the addition of resilient means connected with said rock bars to normally urge said bars and their associated spring teeth toward retracted inoperative positions, and with stop means connected with said bars to limit the retraction of said spring teeth into a constant given raised location, said pin member of said other linkage having substantial coincidental engagement with one end of the slot of said rockable member when the latter is actuated into its maximum position in a direction to render the spring teeth fully retracted and inoperative.

5. An agricultural implement comprising, in combination, a frame, rotary ground working units on said frame providing means to support said frame at a general given elevation above the ground, rock bars pivotally mounted on said frame carrying ground cultivating teeth, and transport wheel means to elevate and lower the frame and its ground working equipment in relation to the ground comprising a cross shaft mounted upon said frame, arms on said shaft, and transport wheels on the free arm ends, and a power actuated mechanism to operate said transport wheel means and said toothed rock bars comprising a hydraulic cylinder, an arm on said cross shaft, a first joining linkage connected between said cylinder and said cross shaft arm, a rockable plate element secured to said cross shaft and having an elongated slot disposed in a position spaced outwardly with respect to said cross shaft axis, and a connecting link means connecting said rock bars and including one link having a pin thereon adapted for riding along the slot in said plate element, said slot ends of said plate element providing limit means to control the retracted and operative positions of the rock bars and teeth during the rockable actuation of said plate element, and said transport wheel means being actuated through said first joining linkage and cylinder between a fully retracted position with the wheels spaced above the ground and a ground engaging position that lifts the frame into an elevated position, said power actuated mechanism functioning to operate said rock bars to initially raise the cultivating teeth while said wheels are being moved toward the ground, continued retraction of said teeth taking place as said wheels touch and react against the ground to raise the frame into an intermediate or full transportable position.

6. An agricultural implement as in claim 5 with resilient means to urge said rock bars and teeth toward retracted positions including limit stop means to positively establish said fully retracted positions, said resilient means functioning independently of the pin and slot connection in said rockable plate element.

7. An agricultural implement as in claim 6, wherein adjustable mechanism is provided including a stop lug coacting with said plate element slot to regulate the available length thereof so as to limit the free motion of said pin of the linkage of the rock bars, whereby to provide a predetermined amount of the ground penetration by said rock bar teeth.

8. An agricultural implement as in claim 5 wherein said implement includes a swingable towing tongue to draw the implement over a field during the operative cultivation of the field, and a tongue control link mechanism is connected between the tongue and a movable part actuated by the motion of said cross shaft, and which tongue control link mechanism includes a locking means to automatically fix the tongue against swinging relative to said implement, said tongue control link mechanism and locking means including cooperative means rendered responsive to lock the tongue to the implement when said transport wheels move into transportable position and to unlock said tongue for swinging movement as said wheels move out of transportable position.

9. An agricultural implement as in claim 8 wherein said tongue control link mechanism comprises a pair of pivotally connected toggle links having their free ends pivotally joined with said tongue and with said frame, a lock pin on one link to counteract relative motion between said links in one direction coincident with a position wherein said links prevent swinging of said tongue relative to said implement, and a telescoping unit having pivotal connection with said links at one end and with said moving part at the other end, said telescoping unit providing separable sections including a stop collar on one section to limit the maximum overlap of said sections in a position to counteract relative movement of said toggle links out of their pin locked relationship when said cross shaft operated moving part is placed in one position coincident with the lowering of the wheels into transport position, said sections being adapted for relative lengthwise separation by said cross shaft operated part during the retraction of said transport wheels whereby said sections release said toggle links out of pin locked positions to again allow said tongue to swing in relation to said implement.

10. An agricultural implement as in claim 5 with the addition of a bracket mounted on said frame having an opening therein and said cross shaft arm has an opening alignable with said bracket opening, and a lock pin insertable through both of said openings when said implement is rigged for transportation with wheels down, said lock pin and aligned openings in said arm and bracket providing coacting means to release said first joining linkage and cylinder from their active operational installation with the implement mechanisms for cylinder interchange.

11. An agricultural implement as in claim 10, wherein said joining linkage includes an intermediate arm mounted for swinging on said frame in a direction toward and away from the hydraulic cylinder, and said intermediate arm comprises at least two pivotally connected arm members secured together through a removable orientation pin, with one of said arm members providing an aperture to accommodate the cross stud of the ram of said hydraulic cylinder, removal of said orientation pin permitting relative swinging between said arm members for selectively shifting said one arm member in relation to said cylinder and its ram location to readily bring about reassembly of the cylinder with the joining linkage regardless of the location of the ram with respect to the cylinder.

12. An agricultural implement comprising a frame supported for operation at a general given elevation to the ground, and cultivating mechanisms carried by said frame comprising rock bars, teeth on said bars, and power operated mechanism to actuate the bars and teeth between fully retracted and maximum ground penetrating positions, said power operated mechanism comprising a hydraulic cylinder having an extensible ram, frame supported link and arm members connected with said ram, a rotatable shaft journalled upon said frame and having connection with said link members, and depth control mechanism for said rock bars and teeth comprising an edgewise swingable plate secured to said shaft and having a slot therein radially spaced from the axis of said shaft and disposed substantially tangentially with respect to said shaft axis, and joining link means connecting said rock bars including a control pin disposed to ride within said plate slot, and spring means connected with said rock bars to urge the same into an inoperative position and in a direction to normally urge said control pin in one direction along the plate slot, and adjustable stop lug means coacting with said slot to selectively reduce the overall length thereof to keep said pin from passing along said slot beyond said lug when being urged in the direction of the lug by said spring means, operation of said rock bars by said depth control means causing a given penetration of said teeth for each adjusted position of said stop lug under actuation of said shaft and plate by said hydraulic cylinder in one direction, reverse operation of said shaft and plate permitting full retraction of said teeth to their same maximum inoperative positions regardless of the slot positions occupied by said stop lug.

13. An agricultural implement as in claim 12 wherein the joining link means comprises a pair of radial arm members connected with said rock bars in equal angular relation, a link member connected with end portions of said radial arm members, and a second link member having one end thereof connected with one of said members and having the control pin at its other end for plate slot engagement, said two link members and said slot pin being arranged to operate substantially in line to transmit the reactive force of said lug through said pin and into both of the connected rock bar link members.

14. An agricultural implement as in claim 12 wherein said adjustable stop lug means comprises a plate arm loosely pivoted upon said rotatable shaft, a stop lug element disposed thereon for disposition alongside of the rock plate slot, said plate arm having a releasable latch member and said rock plate having a notched quadrant to accommodate said latch member to thus selectively join said plates in different angular relations to each other to change the position of said stop lug element with respect to the slot.

15. In an agricultural implement having a supported frame, a pair of rock bars rotatably carried on said frame, tooth members on said rock bars, and depth control mechanism for said tooth members comprising a power operated cylinder, interconnected link mechanism extending between said cylinder with said rock bars, and adjustable gauge mechanism interposed into said interconnected link mechanism comprising a first element mounted for rocking motion upon said frame, a second element mounted for rocking motion relative to said first element, and said interconnected mechanism providing an operating connection from the cylinder end thereof with said first element to rock the latter and having a second operating connection provided from the rock bar end thereof with said same first element to manipulate said rock bars and tooth members, said second operating connection comprising a slot formed in said first element, a pin for said slot carried by said second operating connection, and adjustable means cooperatively carried by said two elements to predetermine the angular relations therebetween, said adjustable means including a gauge lug disposed at the site of the slot and arranged for relative movement therealong to limit the slot length available to said pin, different slot lengths providing different depths of penetration of said tooth members on the rock bars.

16. An agricultural implement as in claim 15, wherein said frame is provided with a cross shaft to fixedly support said first element for rocking motion relative to said frame, said cross shaft having arms thereon arranged to swing about the axis of said cross shaft toward and away from the ground, and transport wheels for said frame rotatably mounted upon the free ends of said arms, said operating connections of said interconnected link mechanism having oppositely spaced connections with said first element in relation to the cross shaft axis to rock the first element in a direction to retract the rock bar teeth while rotating said cross shaft in a direction to lower the transport wheels toward the ground, reverse rocking action of said first element causing raising of said wheels and actuation of said rock bar teeth toward the ground.

17. An agricultural implement as in claim 16, with the further addition of a swingable tongue on said frame and a regulatory linkage mechanism to render said tongue freely swingable under operative field cultivation with said implement and to dispose said same tongue in fixed relation to said frame while in transport condition, said regulatory linkage mechanism comprising a toggle link unit pivotally connected with said tongue and with said frame including stop means to lock said toggle links against motion to hold said tongue in fixed relation to said frame, and telescopic members having one thereof connected with said toggle link unit, said cross shaft including a lever to rotate therewith, the other of said telescopic members having pivotal connection with said lever, said telescopic members having a stop element thereon to lock said members together against further relative motion when said cross shaft is rotated in a direction to lower the transport wheels, said locked position of said telescopic members providing means to hold said toggle unit in locked relation together with the stop means thereof, movement of the lever in the opposite direction by said cross shaft causing said transport wheels to swing upwardly together with the complete release of said telescopic members and toggle unit from their related locked positions to allow free swinging of said tongue relative to the frame of the implement.

(References on following page)

References Cited in the file of this patent

UNITED STATES PATENTS

| | | |
|---|---|---|
| 1,157,812 | Sharp | Oct. 26, 1915 |
| 1,378,432 | Towle | May 17, 1921 |
| 1,477,089 | Towner | Dec. 11, 1923 |
| 1,947,127 | Dunham | Feb. 13, 1934 |
| 2,070,425 | Engel | Feb. 9, 1937 |
| 2,153,038 | Corbett | Apr. 4, 1939 |
| 2,156,571 | Lindgren et al. | May 2, 1939 |
| 2,228,865 | Bird | Jan. 14, 1941 |
| 2,324,840 | Hipple | July 20, 1943 |
| 2,674,168 | Blaydes | Apr. 6, 1954 |
| 2,691,930 | Forgy | Oct. 19, 1954 |
| 2,778,290 | Greeson et al. | Jan. 22, 1957 |
| 2,886,116 | Howard | May 12, 1959 |